US011205171B2

(12) United States Patent
Bhattacharjee et al.

(10) Patent No.: US 11,205,171 B2
(45) Date of Patent: Dec. 21, 2021

(54) METHOD AND SYSTEM FOR CONTEXTUAL OFFERS ON CHECKOUT

(71) Applicant: Mastercard International Incorporated, Purchase, NY (US)

(72) Inventors: Manash Bhattacharjee, Jersey City, NJ (US); Prashant Sharma, Madison, NJ (US); Joseph Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 592 days.

(21) Appl. No.: 15/725,616

(22) Filed: Oct. 5, 2017

(65) Prior Publication Data

US 2019/0108510 A1     Apr. 11, 2019

(51) Int. Cl.
| | |
|---|---|
| *G06Q 20/36* | (2012.01) |
| *G06Q 30/02* | (2012.01) |
| *G06Q 20/38* | (2012.01) |
| *G06Q 20/12* | (2012.01) |
| *G06Q 20/20* | (2012.01) |
| *G06F 16/953* | (2019.01) |

(Continued)

(52) U.S. Cl.
CPC ......... *G06Q 20/363* (2013.01); *G06F 16/953* (2019.01); *G06Q 20/12* (2013.01); *G06Q 20/20* (2013.01); *G06Q 20/209* (2013.01); *G06Q 20/36* (2013.01); *G06Q 20/387* (2013.01); *G06Q 30/0222* (2013.01); *G07G 1/01* (2013.01); *G06F 16/58* (2019.01); *G06Q 30/0641* (2013.01)

(58) Field of Classification Search
CPC ............. G06Q 30/0222; G06Q 20/363; G06Q 30/0641; G06Q 20/12; G06Q 20/20; G06Q 20/209; G06Q 20/36; G06Q 20/387; G06F 16/953; G06F 16/58; G07G 1/01

See application file for complete search history.

(56) References Cited

U.S. PATENT DOCUMENTS

| | | | |
|---|---|---|---|
| 2011/0145068 A1* | 6/2011 | King | G06F 40/169 705/14.55 |
| 2013/0024371 A1* | 1/2013 | Hariramani | G06Q 20/384 705/41 |

(Continued)

*Primary Examiner* — David J Stoltenberg
*Assistant Examiner* — Michael J Cross
(74) *Attorney, Agent, or Firm* — Buchanan Ingersoll & Rooney PC

(57) ABSTRACT

A method for identifying a dynamic checkout button with a contextual offer includes: storing, a plurality of offer data entries, each including display data, a wallet identifier, and a merchant identifier; receiving a page request from an external server, the page request including a specific merchant identifier and a device identifier; receiving a data file from a computing device corresponding to the device identifier, the data file including a specific wallet identifier; identifying a specific offer data entry where the included wallet identifier corresponds to the specific wallet identifier and where the included merchant identifier corresponds to the specific merchant identifier; identifying an image file associated with the specific wallet identifier, wherein the image file includes at least the display data included in the specific offer data entry; and transmitting the identified image file to the external server in response to the page request.

8 Claims, 6 Drawing Sheets

(51) Int. Cl.
*G07G 1/01* (2006.01)
*G06Q 30/06* (2012.01)
*G06F 16/58* (2019.01)

(56) References Cited

U.S. PATENT DOCUMENTS

| | | | |
|---|---|---|---|
| 2013/0159154 A1* | 6/2013 | Purves | G06Q 20/36 |
| | | | 705/35 |
| 2013/0166332 A1* | 6/2013 | Hammad | G06Q 20/12 |
| | | | 705/5 |
| 2013/0246261 A1* | 9/2013 | Purves | G06Q 20/105 |
| | | | 705/41 |
| 2013/0346302 A1* | 12/2013 | Purves | G06Q 20/102 |
| | | | 705/40 |
| 2014/0019352 A1* | 1/2014 | Shrivastava | G06Q 20/3674 |
| | | | 705/41 |
| 2015/0019944 A1* | 1/2015 | Kalgi | G06F 16/958 |
| | | | 715/205 |
| 2015/0026049 A1* | 1/2015 | Theurer | G06Q 20/36 |
| | | | 705/41 |
| 2015/0073907 A1* | 3/2015 | Purves | G06Q 20/32 |
| | | | 705/14.58 |
| 2015/0154588 A1* | 6/2015 | Purves | G06Q 30/0226 |
| | | | 705/14.27 |
| 2015/0220914 A1* | 8/2015 | Purves | G06Q 20/36 |
| | | | 705/26.8 |
| 2015/0379554 A1* | 12/2015 | Copeland | G06Q 30/0239 |
| | | | 705/14.39 |
| 2016/0005030 A1* | 1/2016 | Girish | G06Q 20/322 |
| | | | 705/39 |
| 2016/0253710 A1* | 9/2016 | Publicover | H04W 4/21 |
| | | | 705/14.66 |
| 2017/0032361 A1* | 2/2017 | Purves | G06Q 20/36 |
| 2018/0189779 A1* | 7/2018 | Girish | G06Q 30/0601 |

* cited by examiner

METHOD AND SYSTEM FOR CONTEXTUAL OFFERS ON CHECKOUT

FIELD

The present disclosure relates to the identification of dynamic checkout buttons that include contextual offers, specifically the identification of special offers related to the account, merchant, or financial institution involved in a payment transaction prior to checkout and the presentation of such offers as part of a dynamic checkout button for use in initiating presentation of payment credentials in an electronic payment transaction.

BACKGROUND

The number of electronic wallets being used by consumers has greatly increased over time. As technology has improved, making the use of electronic wallets more secure, consumers have begun to take advantage of the convenience and security that electronic wallets have to offer, enabling the consumer to engage in electronic payment transactions, both in person and remotely (e.g., in e-commerce transactions), without having to carry around payment cards or be constantly entering payment information into their computing device. Some electronic wallets also offer additional benefits to provide the consumer with further incentives to use the wallet, including the providing of offers and other deals.

Due to the advantages of electronic wallets, many issuers and other financial institutions that issue transaction accounts to consumers have a great interest in providing electronic wallets to their customers. In many cases, these issuers or other institutions will attempt to advertise or otherwise communicate the incentives for their own particular wallet, in an effort to entice the consumer to use their product. However, technological limitations on checkout systems are such that they are static with respect to the presentation of electronic wallets for use at checkout. As a result, wallet providers and other associated institutions have to convey incentives to consumers in other ways, such as via mailings, text messages, emails, etc. Unfortunately, there is an inability to ensure that such information is delivered concurrently with the consumer attempting a payment transaction, and as such the consumer is not apprised of the incentives for a particular electronic wallet at the time when the consumer must select their payment method.

Thus, there is a need for a technological solution whereby the checkout button for an electronic wallet can be dynamically identified based on an offer related to the context of a payment transaction to be processed, to convey information associated with that offer as part of the checkout button. As a result, the consumer may be presented with a dynamic checkout button that includes a contextual offer to entice the consumer to use the associated electronic wallet for funding of the electronic payment transaction.

SUMMARY

The present disclosure provides a description of systems and methods for identifying dynamic checkout buttons with contextual offers. When a web page or application program calls for data to load the display, which will include checkout options for a transaction, the page or program may contact a server. The server will identify the computing device that is to display the data, such as via cookies or other data file received therefrom, and may identify an offer provided by electronic wallet providers that is applicable to the transaction. A dynamic checkout button is then identified that includes details related to the offer, such that when the consumer is choosing an electronic wallet, they can be apprised of an incentive offered by the electronic wallet for its use. Such a dynamic presentation may increase the usage of an electronic wallet, and thus revenue to the institution, while also providing consumers with offers they may have not been aware of or may have not remembered to utilize at the time of checkout.

A method for identifying a dynamic checkout button with a contextual offer includes: storing, in an offer database of a processing server, a plurality of offer data entries, wherein each offer data entry includes a structured data set related to an offer including at least display data, a wallet identifier, and a merchant identifier; receiving, by a receiving device of the processing server, a page request from an external server, wherein the page request includes at least a specific merchant identifier and a device identifier; receiving, by the receiving device of the processing server, a data file from a computing device corresponding to the device identifier, wherein the data file includes at least a specific wallet identifier; executing, by a querying module of the processing server, a query on the offer database to identify a specific offer data entry where the included wallet identifier corresponds to the specific wallet identifier and where the included merchant identifier corresponds to the specific merchant identifier; identifying, by a data identification module of the processing server, an image file associated with the specific wallet identifier, wherein the image file includes at least the display data included in the specific offer data entry; and electronically transmitting, by a transmitting device of the processing server, the identified image file to the external server in response to the page request.

A system for identifying a dynamic checkout button with a contextual offer includes: an offer database of a processing server configured to store a plurality of offer data entries, wherein each offer data entry includes a structured data set related to an offer including at least display data, a wallet identifier, and a merchant identifier; a receiving device of the processing server configured to receive a page request from an external server, wherein the page request includes at least a specific merchant identifier and a device identifier, and a data file from a computing device corresponding to the device identifier, wherein the data file includes at least a specific wallet identifier; a querying module of the processing server configured to execute a query on the offer database to identify a specific offer data entry where the included wallet identifier corresponds to the specific wallet identifier and where the included merchant identifier corresponds to the specific merchant identifier; a data identification module of the processing server configured to identify an image file associated with the specific wallet identifier, wherein the image file includes at least the display data included in the specific offer data entry; and a transmitting device of the processing server configured to electronically transmit the identified image file to the external server in response to the page request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
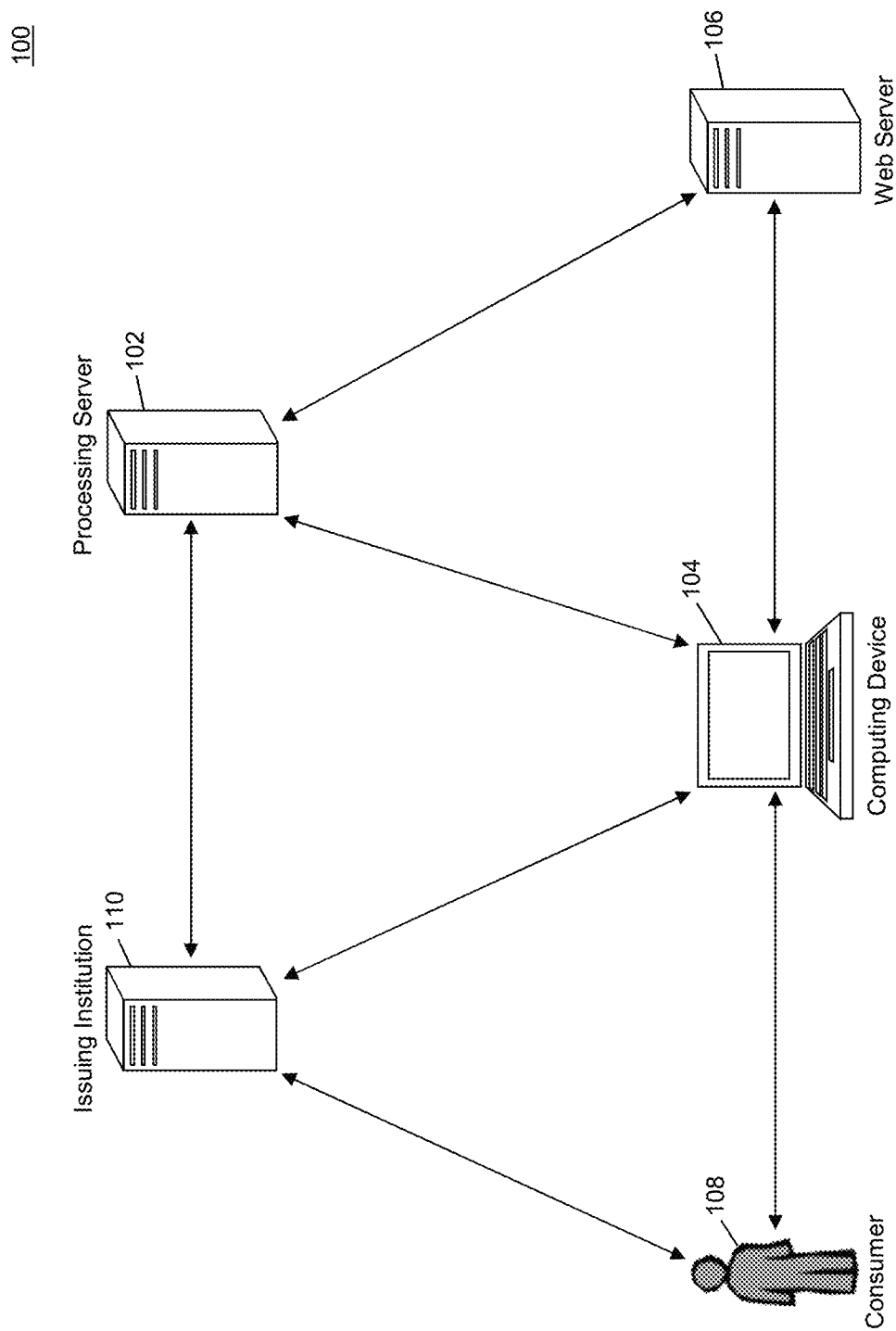
FIG. 1 is a block diagram illustrating a high level system architecture for identification of dynamic checkout buttons with contextual offers in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Dynamic Checkout Buttons with Contextual Offers

FIG. 1 illustrates a system 100 for the identification of dynamic checkout buttons for electronic wallets and other electronic payment methods that incorporate contextual offers for use in an electronic payment transaction.

The system 100 may include a processing server 102. The processing server 102, discussed in more detail below, may be configured to identify dynamic checkout buttons that include data associated with contextual offers as part of an electronic payment transaction. In the system 100, a consumer 108 may navigate to a web page via a web browsing application program executed by a computing device 104. The computing device 104 may be any type of computing device configured to perform the functions discussed herein, such as a desktop computer, laptop computer, notebook computer, tablet computer, cellular phone, smart phone, smart watch, smart television, wearable computing device, etc.

The computing device 104 may receive web page data from a web server 106 for display on a display device interfaced therewith when navigating to a web page. The computing device 104 and web server 106 may communicate using any suitable communication networks and methods, such as via the Internet. The consumer 108 may instruct the computing device 104 to navigate to web pages associated with a merchant that offers one or more products for purchase. The consumer 108 may, via the computing device 104, select one or more products to purchase using traditional methods and systems. Once the consumer 108 has made their selections, the consumer 108 may be provided with, by the web site, an opportunity to begin the checkout process for their payment transaction. As will be apparent to persons having skill in the relevant art, the checkout process for a payment transaction conducted via a web page traditionally involves the selection of a transaction account for funding of the payment transaction and selection and/or supplying of other transactional details, such as billing address, shipping address, delivery method, etc. As discussed herein, checkout may include any process related to the initiation of an electronic payment transaction that involves the selection of an electronic wallet and/or payment method for use in funding the payment transaction.

Via the processing server 102, the web server 106 may be configured to present one or more dynamic checkout buttons to the consumer 108 via the web page displayed by the computing device 104, where each checkout button may be associated with an electronic wallet or transaction account that may be used to fund the payment transaction. As discussed herein, a dynamic checkout button may be a checkout button whose image file varies or changes based on the availability and value of a contextual offer related to the payment transaction. As part of the delivery of web page data for a web page that includes checkout buttons, the web server 106 may electronically transmit a page request to the processing server 102 using a suitable communication network and method. The page request may include at least a device identifier associated with the computing device 104 and a merchant identifier associated with a merchant involved in the potential payment transaction (e.g., the merchant with whom the purchase is to be made). The device identifier may be a unique value associated with the computing device 104 for use in identification thereof, such as a media access control address, identification number, serial number, registration number, internet protocol address, etc. The merchant identifier may be a unique value associated with the merchant, such as an identification number, merchant name, serial number, etc.

The processing server 102 may receive the page request and may receive a data file from the computing device 104 associated with the device identifier included in the page request. In one embodiment, the page request may include or be accompanied by the data file. In another embodiment, the processing server 102 may electronically transmit a request for the data file to the computing device 104, using the device identifier in the request thereof, where such a request may be communicated via any suitable communication network and method (e.g., the Internet). The data file may include at least a wallet identifier associated with an electronic wallet or other payment instrument. The wallet identifier may be a unique value associated with the corresponding payment instrument, such as an identification number, wallet name, etc. In some embodiments, the data file may also include a transaction account identifier, which may be a unique value associated with a transaction account to be used to fund the payment transaction, such as a primary account number or portion thereof. The data file may be any type of data file suitable for conveying the data included therein, such as a cookie.

The processing server 102 may receive the data file from the computing device 104 and may then identify a contextual offer eligible for redemption in connection with the potential payment transaction based on the data included in the data file and the page request. The processing server 102 may receive offer data for a plurality of offers from one or more issuing institutions 110. Issuing institutions may be financial institutions, such as issuing banks, or other institutions configured to issue transaction accounts to consumers 108 for use in funding electronic payment transactions. Issuing institutions 110 may provide offers for use of transaction accounts issued therefrom or otherwise associated therewith, and provide data for such offers to the processing server 102. Offers may be merchant-specific, account-specific, or a combination thereof. The processing server 102 may receive offer data from the issuing institution 110 using a suitable communication network or method, which may be comprised of at least display data, a wallet identifier, and a merchant identifier. The wallet identifier may be associated with the payment instrument with which the offer may be redeemed, and the merchant identifier may be associated with a merchant that must be involved in the payment transaction for redemption of the offer. The display data may include data to be displayed as part of the dynamic checkout button for the associated payment instrument, which may include an image file or other data to be inserted into, superimposed on, or otherwise included in the dynamic checkout button.

The processing server 102 may store received offer data in an offer database, discussed in more detail below. When the processing server 102 receives a page request and data file, the processing server 102 may identify offer data stored therein that is specific to the electronic wallet to be used and the merchant and/or transaction account involved in the potential payment transaction, based on correspondences between wallet identifiers and merchant and/or transaction account identifiers included in the respective data. The processing server 102 may then identify a dynamic checkout button for the electronic wallet that includes the display data for the corresponding offer. In instances where multiple offers may have been identified (e.g., a merchant-specific offer and an account-specific offer), the processing server 102 may identify multiple checkout buttons or may select one of the offers for display in the dynamic checkout button. In such cases, the one offer may be selected based on the value of each offer, such as by selecting the offer with the higher discount. In some such cases, the consumer 108 may provide preferences (e.g., stored in a transaction account profile and/or included in the data file) for use in selecting an offer.

In some embodiments, the processing server 102 may store a plurality of dynamic checkout button image files, where each image file is associated with an electronic wallet and includes different display data, where identification of the dynamic checkout button for an offer may include identifying the pre-stored image file that includes the same display data. In other embodiments, the processing server 102 may be configured to generate the image file using one or more image processing techniques. For instance, the processing server 102 may identify an image file associated with the electronic wallet corresponding to the wallet identifier and may use image processing techniques to superimpose the display data for the identified offer onto the image file to generate a new image file for use as the dynamic checkout button. In such an instance, the electronic wallet image file used as a base for the dynamic checkout button may include a predetermined area for inclusion of display data for an identified offer.

Once an image file has been identified for the dynamic checkout button, the processing server 102 may electronically transmit the image file to the web server 106 in response to the page request. The web server 106 may then deliver the image file with the rest of the web page data to the computing device 104 for display to the consumer 108. The consumer 108 may then see all of the checkout buttons on the web page for selection of a payment method, including the dynamic checkout button that displays an offer eligible for redemption via the transaction, to entice the consumer 108 for selection thereof. The consumer 108 may interact with the dynamic checkout button to initiate the payment transaction to be funded via the corresponding electronic wallet (e.g., using a transaction account stored therein), where the contextual offer may be applied to the payment transaction during processing using traditional methods and systems. As a result, the issuing institution 110 may experience higher usage rates for their electronic wallets and other payment instruments by providing the contextual offers, and consumers 108 may be apprised of more offers when conducting payment transactions via the Internet. Thus, the processing server 102 improves on traditional technical systems where checkout buttons are static images that cannot incorporate contextual offers, particularly in real-time at a time when a web page is to be loaded.

Processing Server

Figure 2:
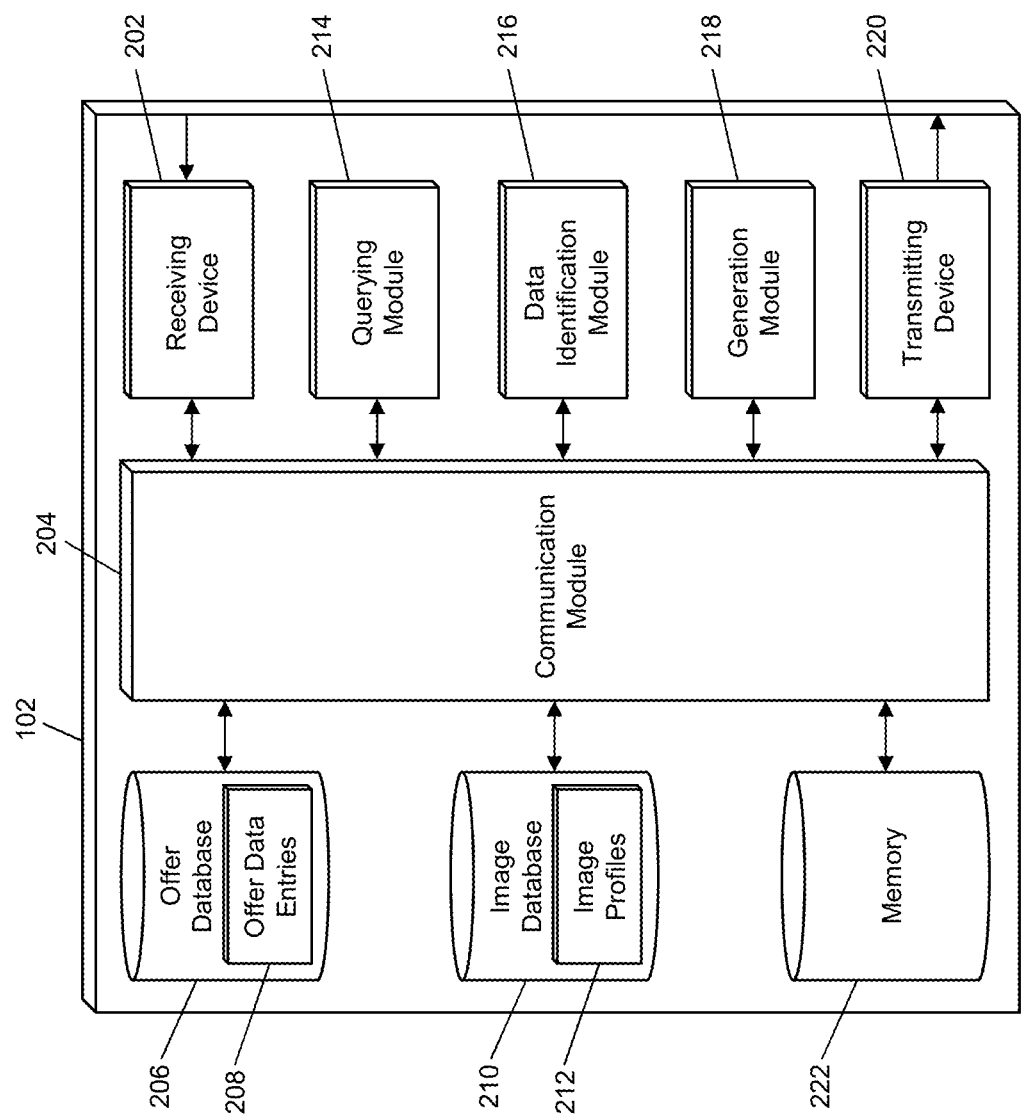
FIG. 2 is a block diagram illustrating the processing server of the system of FIG. 1 for the identification of dynamic checkout buttons with contextual offers in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 104, web servers 106, issuing institutions 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 that are superimposed or otherwise encoded with data files, such as cookies, which may include at least wallet identifiers and may further include device identifiers and/or transaction account identifiers. The receiving device 202 may also be configured to receive data signals electronically transmitted by web servers 106, which may be superimposed or otherwise encoded with page requests, which may include at least merchant identifiers and device identifiers. The receiving device 202 may be further configured to receive data signals electronically transmitted by issuing institutions 110, which may be superimposed or otherwise encoded with offer data, which may include data related to an offer including at least display data, a wallet identifier, and a merchant and/or transaction account identifier.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, data identification module 216, generation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an offer database 206. The offer database 206 may be configured to store a plurality of offer data entries 208 using a suitable data storage format and schema. The offer database 206 may be a relational database that utilizes structured query language for the storage, identification, modifying, updating, accessing, etc. of structured data sets stored therein. Each offer data entry 208 may be a structured data set configured to store data related to an offer for redemption in an electronic payment transaction. An offer data entry 208 may include at least a display data, a wallet identifier associated with an electronic wallet eligible for use for redemption of the related offer, and a merchant identifier associated with a merchant with whom the electronic payment transaction must be conducted for redemption. In some cases, an offer data entry 208 may include multiple merchant identifiers and/or wallet identifiers. The display data may include data to be displayed on or in the dynamic checkout button if the offer is selected for display in association therewith. In some cases, the display data may be an image file.

In some embodiments, the processing server 102 may also include an image database 210. The image database 210 may be configured to store a plurality of image profiles 212 using a suitable data storage format and schema. The image database 210 may be a relational database that utilizes structured query language for the storage, identification, modifying, updating, accessing, etc. of structured data sets stored therein. Each image profile 212 may be a structured data set configured to store data related to an image file. An image profile 212 may include, for instance, a wallet identifier and an image file associated therewith, where the image file may be used as a base image for a dynamic checkout button for the electronic wallet corresponding to the wallet identifier. In some cases, an image profile 212 may further include display data, where an image profile 212 may be identified for a specific offer based on the associated wallet identifier and display data.

The processing server 102 may include a querying module 214. The querying module 214 may be configured to execute queries on databases to identify information. The querying module 214 may receive one or more data values or query strings, and may execute a query string based thereon on an indicated database, such as the offer database 206, to identify information stored therein. The querying module 214 may then output the identified information to an appropriate engine or module of the processing server 102 as necessary. The querying module 214 may, for example, execute a query on the offer database 206 to identify an offer data entry 208 where the included wallet identifier and merchant identifier correspond to a wallet identifier and merchant identifier included in a received data file and page request, respectively. The querying module 214 may also be configured to execute queries on the image database 210 to identify image profiles 212 based on at least wallet identifiers for identification of image files stored therein.

The processing server 102 may also include a data identification module 216. The data identification module 216 may be configured to identify data for performing the functions of the processing server 102 as discussed herein. The data identification module 216 may receive an instruction, may identify data based on the instruction, and may output the identified data to another module or engine of the processing server 102. The data identification module 216 may be configured to, for example, identify an image file for use as a dynamic checkout button, such as by identifying display data and a wallet identifier in an offer data entry 208 and issuing an instruction to the querying module 214 to identify a corresponding image profile 212 for identification of the image file stored therein. The data identification module 216 may also be configured to identify a specific offer from a plurality of offers that may correspond to a received page request and/or data file, where such an identification may be based on offer values associated with each offer. In some cases, the data identification module 216 may utilize criteria for selection of an offer, such as may be included in the data file or may be previously provided by the consumer 108 and stored in a profile associated with the transaction account to be involved in the potential payment transaction.

The processing server 102 may also include a generation module 218. The generation module 218 may be configured to generate data for use in performing the functions of the processing server 102 as discussed herein. The generation module 218 may receive an instruction as input, may generate data as instructed, and may output the generated data to another module or engine of the processing server 102. For example, the generation module 218 may be configured to generate image files using known image processing techniques, such as to superimposed or otherwise insert offer display data into an existing image file associated with an electronic wallet for the generation of an image file to serve as the dynamic checkout button for the electronic wallet. The generation module 218 may also be configured to generate data, such as data requests for submission to computing devices 104 to request data files for use in performing the functions discussed herein.

The processing server 102 may also include a transmitting device 220. The transmitting device 220 may be configured to transmit data over one or more networks via one or more network protocols. In some instances, the transmitting device 220 may be configured to transmit data to computing devices 104, web servers 106, issuing institutions 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing devices 104, which may be superimposed or otherwise encoded with data file requests. Data file requests may include an identification value associated with the data file for use by the computing device 104 in identifying a data file that is being requested, such as an identification name or an identification number. The transmitting device 220 may also be configured to electronically transmit data signals to web servers 106, which may be superimposed or otherwise encoded with image files, which may be provided in response to received page requests and may be used for display of dynamic checkout buttons on the computing device 104. The transmitting device 220 may also be configured to electronically transmit data signals to issuing institutions 110, which may be superimposed or otherwise encoded with requests for offer data, or other data that may be provided to the issuing institution 110 for use in the processing of offers and electronic payment transactions, such as indications when an offer is presented to the consumer 108 via the dynamic checkout button.

The processing server 102 may also include a memory 222. The memory 222 may be configured to store data for use by the processing server 102 in performing the functions discussed herein, such as public and private keys, symmetric keys, etc. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein. The memory 222 may be configured to store, for example, profile data for transaction accounts, such as account identifiers, offer selection criteria and preferences, historical transaction data, etc.

Process for Identification of a Dynamic Checkout Button

Figure 3:
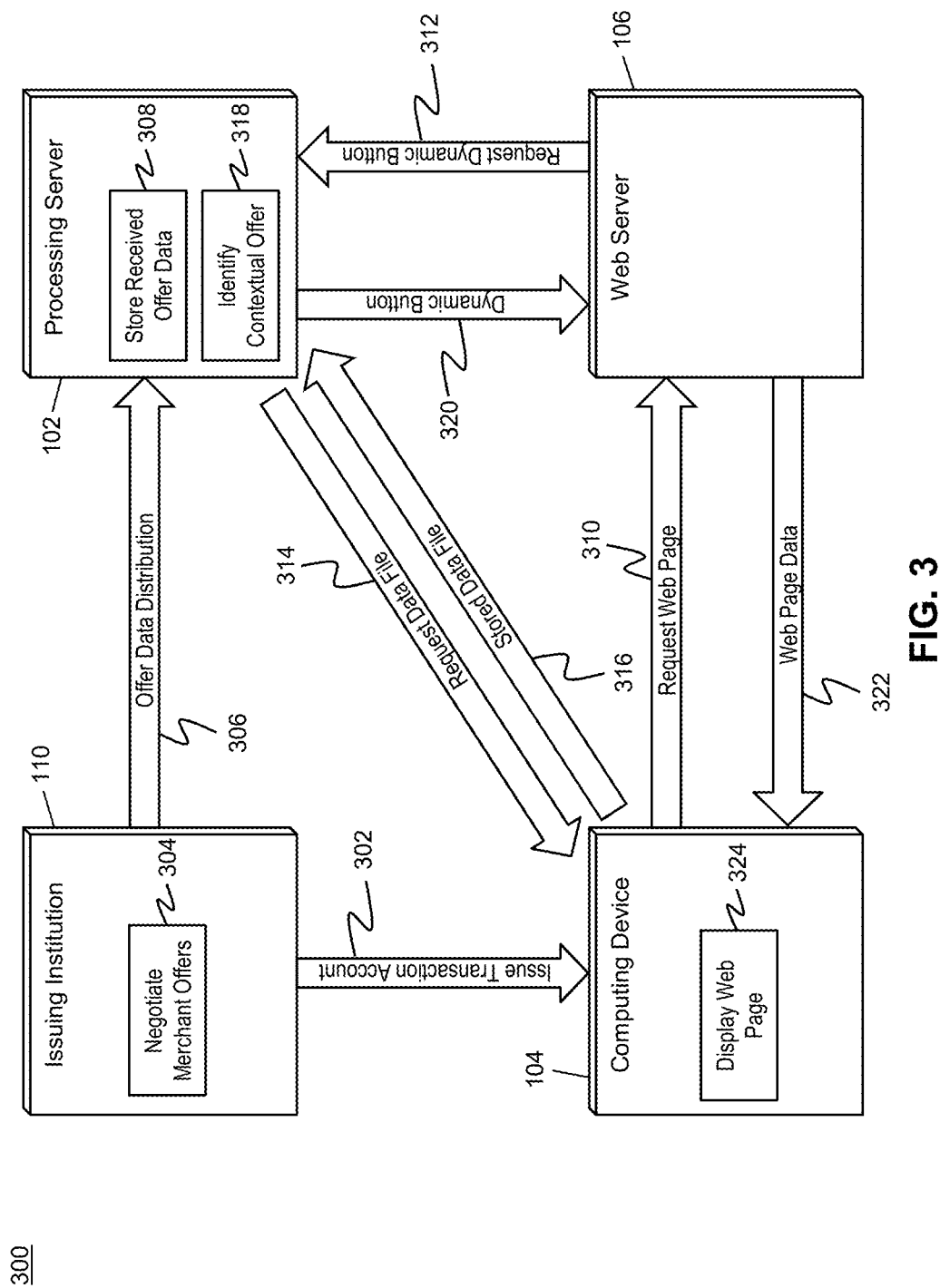
FIG. 3 is a flow diagram illustrating a process for identifying and presenting a dynamic checkout button incorporating a contextual offer for initiation of a payment transaction in the system of FIG. 1 in accordance with exemplary embodiments.

FIG. 3 illustrates a process 300 for the identification of a dynamic checkout button that includes a contextual offer for display to the consumer 108 in the system 100.

In step 302, the issuing institution 110 may issue a transaction account to the consumer 108 as a user of the computing device 104. As part of the issuing of the transaction account, the issuing institution 110 may provide the consumer 108 with payment credentials for the transaction account, including, for instance, a primary account number, expiration date, and security code. In step 304, the issuing institution 110 may negotiate offers with one or more merchants, where an offer may be redeemed for a payment transaction with the respective merchant. The negotiation of the offer may include identifying an offer value for the offer, identifying the merchant identifier for the respective merchant, and identifying display data to be displayed for identification of the offer by the consumer 108. In step 306, the issuing institution 110 may electronically transmit the offer data for each of the negotiated offers to the processing server 102, to be received by the receiving device 202 thereof. In step 308, the querying module 214 of the processing server 102 may execute queries on the offer database 206 to insert a new offer data entry 208 therein for each of the offers for which data is received.

In step 310, the computing device 104 may request a web page related to a merchant from a web server 106. The web server 106 may receive the web page request, which may include the device identifier associated with the computing device 104. In step 312, the web server 106 may electronically transmit a page request to the processing server 102 to request a dynamic checkout button for display on the corresponding web page. The request may include at least the merchant identifier associated with the merchant related to the web page, and the device identifier associated with the computing device 104.

In step 314, the transmitting device 220 of the processing server 102 may electronically transmit a request for a data file to the computing device 104 via a suitable communication network and method, where the computing device 104 may be identified via the device identifier. In some cases, the request may also include a unique identifier associated with the data file for identification thereof by the computing device 104. The computing device 104 may identify the data file and, in step 316, may electronically transmit the data file to the processing server 102 for receipt thereby via the receiving device 202. The data file may include at least a wallet identifier associated with an electronic wallet stored on or otherwise accessible by the computing device 104. In some embodiments, the data file may be a cookie.

In step 318, the querying module 214 of the processing server 102 may execute a query on the offer database 206 to identify an offer data entry 208 where the included wallet identifier and merchant identifier correspond to the wallet identifier included in the received data file and the merchant identifier included in the received web page request. The data identification module 216 and/or generation module 218 of the processing server 102 may generate or otherwise identify an image file that includes the display data included in the identified offer data entry 208, which may be used as the dynamic checkout button. In step 320, the transmitting device 220 of the processing server 102 may electronically transmit the image file to the web server 106. In step 322, web page data for the web page, including the image file for the dynamic checkout button, may be delivered to the computing device 104 from the web server 106 using a suitable communication network and method. In step 324, the computing device 104 may display the web page, including the dynamic checkout button, using a suitable display device.

Graphical User Interface

Figure 4:
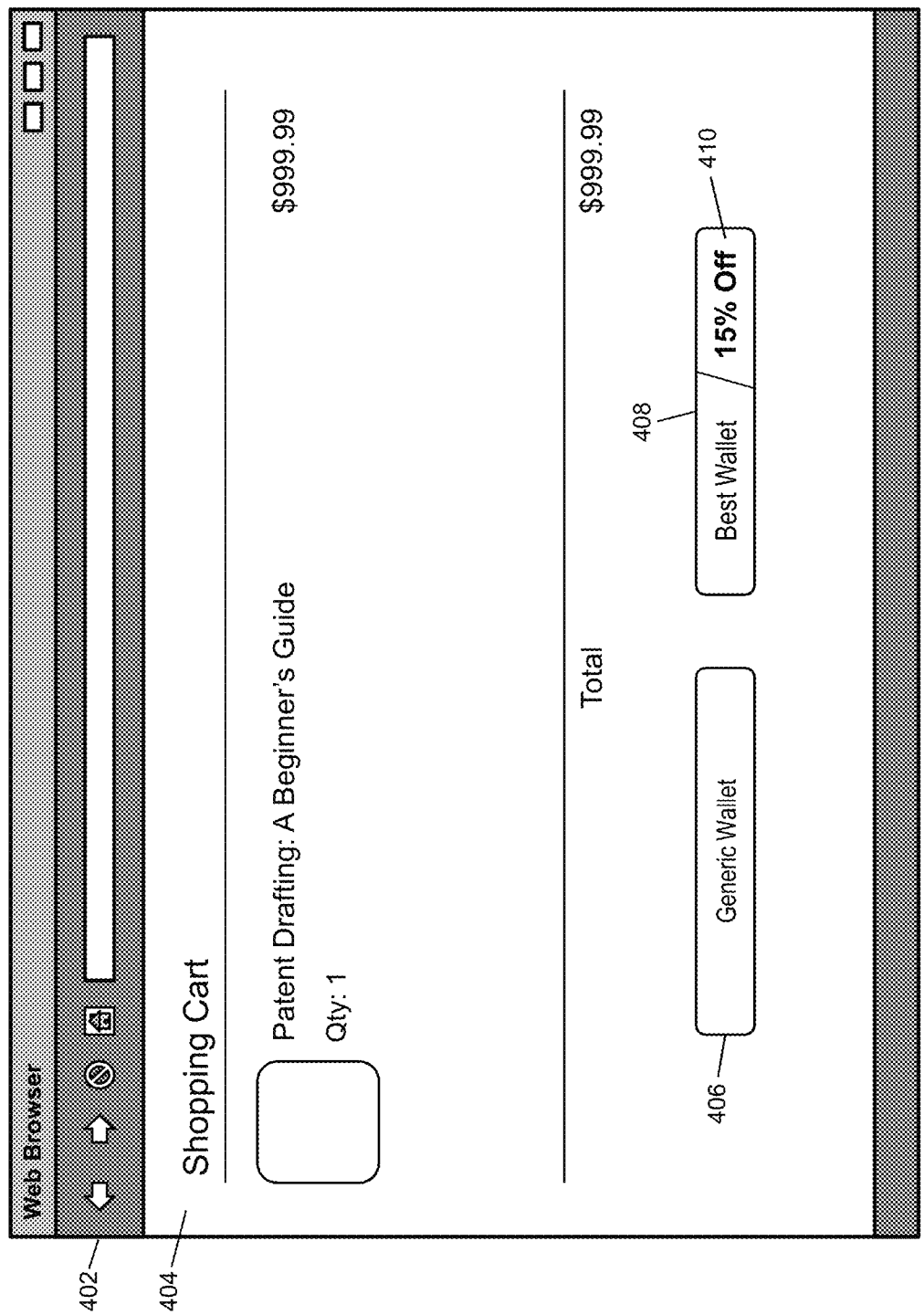
FIG. 4 is a diagram illustrating a graphical user interface of the computing device of the system of FIG. 1 including a dynamic checkout button with a contextual offer in accordance with exemplary embodiments.

FIG. 4 illustrates an interface of the computing device 104 that includes the display of a dynamic checkout button that includes a contextual offer, such as identified by the processing server 102 using the methods discussed herein. It will be apparent to persons having skill in the relevant art that the interface illustrated in FIG. 4 and discussed herein is an example, and that alternative or additional interfaces may be used in the display of a dynamic checkout button identified using the methods discussed herein.

FIG. 4 illustrates a web browser 402, which may be displayed as part of a web browsing application program executed by the computing device 104. The web browser 402 may display a web page 404. The web page 404 may display web page data received from the web server 106, which, in the illustrated example, may display a shopping cart that lists one or more goods or services to be purchased by the consumer 108 as the user of the computing device 104.

The web page 404 may display a plurality of checkout buttons. The checkout buttons may include a generic checkout button 406, which may correspond to a standard electronic wallet ("Generic Wallet," in the illustrated example) or other traditional payment method that may be utilized by the consumer 108. The checkout buttons may also include a dynamic checkout button 408. The dynamic checkout button 408 may be associated with a specific payment method, such as "Best Wallet" in the illustrated example. The dynamic checkout button 408 may include a contextual offer 410. In the illustrated example, the contextual offer 410 is an offer for 15% off the purchase if the consumer 108 utilizes Best Wallet to pay for the transaction. As a result, the consumer 108 may be influenced to use Best Wallet over Generic Wallet to pay for the transaction due to the savings provided.

Figure 5:
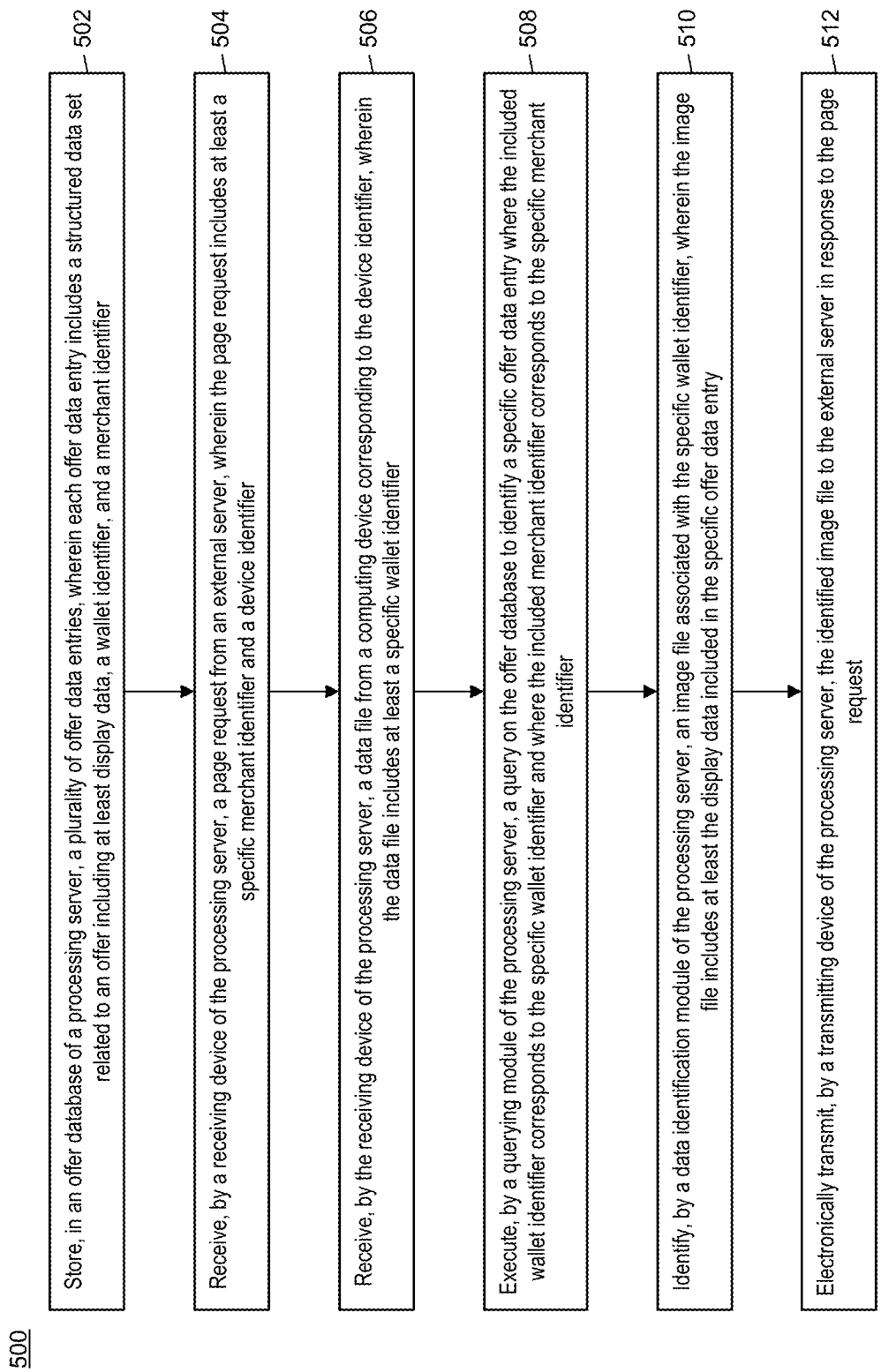
FIG. 5 is a flow chart illustrating an exemplary method for identifying a dynamic checkout button with a contextual offer in accordance with exemplary embodiments.

Exemplary Method for Identifying a Dynamic Checkout Button with a Contextual Offer FIG. 5 illustrates a method 500 for the identification of a dynamic checkout button associated with a method of payment that includes or otherwise identifies a contextual offer available for redemption as part of a payment transaction funded via the associated method of payment.

In step 502, a plurality of offer data entries (e.g., offer data entries 208) may be stored in an offer database (e.g., the offer database 206) of a processing server (e.g., the processing server 102), wherein each offer data entry includes a structured data set related to an offer including at least display data, a wallet identifier, and a merchant identifier. In step 504, a page request may be received by a receiving device (e.g., the receiving device 202) of the processing server from an external server (e.g., the web server 106), wherein the page request includes at least a specific merchant identifier and a device identifier.

In step 506, a data file may be received by the receiving device of the processing server from a computing device (e.g., the computing device 104) corresponding to the device identifier, wherein the data file includes at least a specific wallet identifier. In step 508, a query may be executed on the offer database by a querying module (e.g., the querying module 214) of the processing server to identify a specific offer data entry where the included wallet identifier corresponds to the specific wallet identifier and where the included merchant identifier corresponds to the specific merchant identifier.

In step 510, an image file associated with the specific wallet identifier may be identified by a data identification module (e.g., the data identification module 216) of the processing server, wherein the image file includes at least the display data included in the specific offer data entry. In step 512, the identified image file may be electronically transmitted by a transmitting device (e.g., the transmitting device 220) of the processing server to the external server in response to the page request.

In one embodiment, the data file may further include a specific transaction account identifier. In a further embodiment, each offer data entry may further include a transaction account identifier, and the transaction account identifier included in the specific offer data entry may correspond to the specific transaction account identifier. In another further embodiment, the plurality of offer data entries may include additional offer data entries including at least display data, a transaction account identifier, and a wallet identifier, each offer data entry further includes an offer value, and the method 400 may further include: executing, by the querying module of the processing server, a query on the offer database to identify an account-specific offer data entry where the included wallet identifier corresponds to the specific wallet identifier and where the included transaction account identifier corresponds to the specific transaction account identifier, wherein the display data included in the image file is substituted for the display data included in the account-specific offer data entry if the offer value included in the account-specific offer data entry is greater than the offer value included in the specific offer data entry. In yet another further embodiment, the specific transaction account identifier may be included in a separate data file received concurrently with the data file.

In some embodiments, the data file may be a cookie. In one embodiment, the method 500 may also include storing, in an image database (e.g., the image database 210) of the processing server, a plurality of image profiles (e.g., image profiles 212), wherein each image profile includes a structured data set including at least a wallet identifier and a display image, wherein identifying the image file includes executing, by the querying module of the processing server, a query on the image database to identify a specific image profile where the included wallet identifier corresponds to the specific wallet identifier, and the image file includes the display image included in the specific image file.

Computer System Architecture

Figure 6:
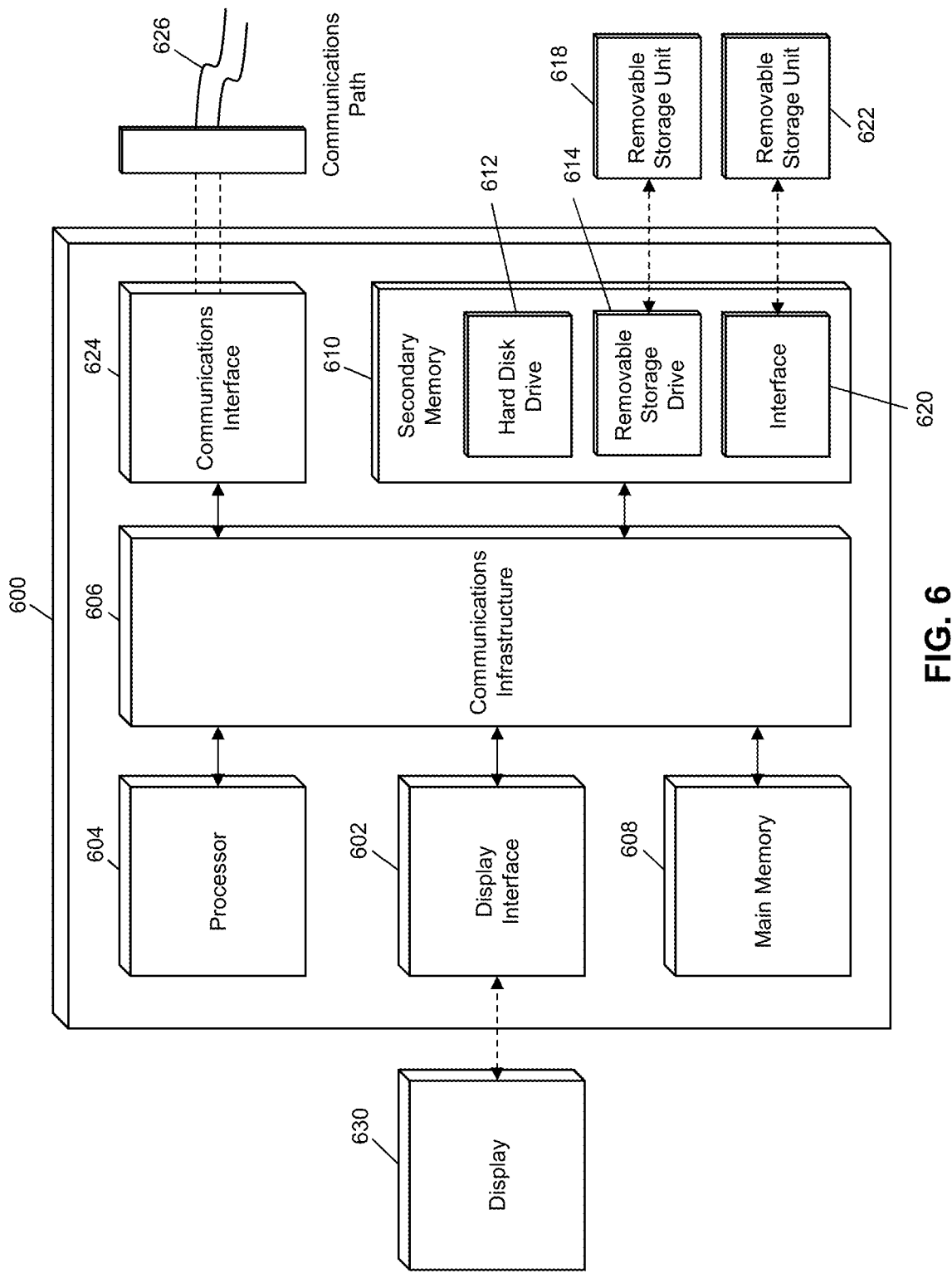
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc.

Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 4, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for identification of dynamic checkout buttons with contextual offers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying a dynamic checkout button with a contextual offer as part of an electronic payment transaction, comprising:

storing, in an offer database of a processing server, a plurality of offer data entries, wherein each offer data entry includes a structured data set related to a contextual offer eligible for redemption, said structured data set including at least (i) display data for the contextual offer, (ii) a wallet identifier associated with an electronic wallet eligible to redeem the contextual offer, (iii) a transaction identifier associated with a transaction account, (iv) a merchant identifier, and (v) and an offer value;

receiving, by a receiving device of the processing server, a page request from an external server, wherein the page request includes at least a specific merchant identifier and a device identifier;

receiving, by the receiving device of the processing server, a data file from a computing device corresponding to the device identifier, wherein the data file includes at least a specific wallet identifier and a specific transaction account identifier;

executing, by a querying module of the processing server, a first query on the offer database to identify a specific offer data entry including a specific contextual offer eligible for redemption, where the wallet identifier included in the structured data set of the specific offer data entry corresponds to the specific wallet identifier included in the data file received from the computing device, and where the merchant identifier included in the structured data set of the specific offer data entry corresponds to the specific merchant identifier included in the page request received from the external server;

identifying, by a data identification module of the processing server, a first image file associated with the specific wallet identifier;

generating, by the processing server, a second image file by superimposing the display data for the contextual offer included in the specific offer data entry on the first image file for use as the dynamic checkout button;

executing, by the querying module of the processing server, a second query on the offer database to identify an account-specific offer data entry where (i) the included wallet identifier corresponds to the specific wallet identifier included in the data file received from the computing device, and (ii) the included transaction account identifier corresponds to the specific transaction account identifier included in the data file received from the computing device;

determining, by the processing server, that the offer value included in the identified account-specific offer data entry is greater than the offer value included in the identified specific offer data entry;

in response to determining that the offer value included in the identified account-specific offer data entry is greater than the offer value included in the identified specific offer data entry, substituting the display data included in the second image file for the display data included in the account-specific offer data entry; and electronically transmitting, by a transmitting device of the processing server, the generated second image file, including the substituted display data, to the external server in response to the page request, for delivery to and display on the computing device for user selection.

2. The method of claim 1, wherein the specific transaction account identifier is included in a separate data file received concurrently with the data file.

3. The method of claim 1, wherein the data file is a cookie.

4. The method of claim 1, further comprising:

storing, in an image database of the processing server, a plurality of image profiles, wherein each image profile includes a structured data set including at least a wallet identifier and a display image, wherein identifying the first image file includes executing, by the querying module of the processing server, a query on the image database to identify a specific image profile where the included wallet identifier corresponds to the specific wallet identifier.

5. A system for identifying a dynamic checkout button with a contextual offer as part of an electronic payment transaction, comprising:

an offer database, of a processing server, configured to store a plurality of offer data entries, wherein each offer data entry includes a structured data set related to a contextual offer eligible for redemption, said structured data set including at least (i) display data for the contextual offer, (ii) a wallet identifier associated with an electronic wallet eligible to redeem the contextual offer, (iii) a transaction identifier associated with a transaction account, (iv) a merchant identifier, and (v) an offer value;

a receiving device of the processing server configured to receive a page request from an external server, wherein the page request includes at least a specific merchant identifier and a device identifier, and a data file from a computing device corresponding to the device identifier, wherein the data file includes at least a specific wallet identifier and a specific transaction identifier;

a querying module, of the processing server, configured to execute a first query on the offer database to identify a specific offer data entry including a specific contextual offer eligible for redemption, where the wallet identifier included in the structured data set of the specific offer data entry corresponds to the specific wallet identifier included in the data file received from the computing device, and where the merchant identifier included in the structured data set of the specific offer data entry corresponds to the specific merchant identifier included in the page request received from the external server;

a data identification module, of the processing server, configured to identify a first image file associated with the specific wallet identifier; and a transmitting device of the processing server, wherein the processing server is configured to generate a second image file by superimposing the display data for the contextual offer included in the specific offer data entry on the first image file for use as the dynamic checkout button, wherein the querying module, of the processing server, is further configured to execute a second query on the offer database to identify an account-specific offer data entry where (i) the included wallet identifier corresponds to the specific wallet identifier included in the data file received from the computing device, and (ii) the included transaction account identifier corresponds to the specific transaction account identifier included in the data file received from the computing device, the processing server is further configured to determine whether the offer value included in the identified account-specific offer data entry is greater than the offer value included in the identified specific offer data entry;

in response to determining that the offer value included in the identified account-specific offer data entry is greater than the offer value included in the identified specific offer data entry, the processing server is further configured to substitute the display data included in the second image file for the display data included in the account-specific offer data entry; and wherein the transmitting device is configured to electronically transmit the generated second image file, including the substituted display data, to the external server in response to the page request, for delivery to and display on the computing device for user selection.

6. The system of claim 5, wherein the specific transaction account identifier is included in a separate data file received concurrently with the data file.

7. The system of claim 5, wherein the data file is a cookie.

8. The system of claim 5, further comprising:

an image database of the processing server configured to store a plurality of image profiles, wherein each image profile includes a structured data set including at least a wallet identifier and a display image, wherein identifying the image file includes executing, by the querying module of the processing server, a query on the image database to identify a specific image profile where the included wallet identifier corresponds to the specific wallet identifier.

* * * * *